UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF PREPARING PHENOLIC CONDENSATION PRODUCTS.

1,253,404. Specification of Letters Patent. Patented Jan. 15, 1918.

No Drawing. Application filed February 5, 1914, Serial No. 816,773. Renewed November 30, 1917. Serial No. 204,784.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Processes of Preparing Phenolic Condensation Products, of which the following is a specification.

My invention relates to the preparation of resinous condensation products by reaction between phenolic substances and aldehydes.

One object of my invention is to simplify the process of preparing condensation products of the character indicated, and to effect important economies in their manufacture.

Another object of my invention is to utilize certain factory waste substances in the production of valuable resinous products.

My present invention is an improvement over the process which I have described and claimed in my copending application, Serial No. 755,799, filed March 20, 1913, in which I have disclosed a process of forming condensation products from phenols and aldehydes with the use of carbon dioxid as a condensing agent.

According to my present invention, I dispense with the use of aldehyde as a starting material, and form the aldehyde during one of the stages of the process.

My process consists in partly reducing carbon dioxid to formaldehyde and treating a phenolic substance with the resulting gaseous mixture of carbon dioxid and formaldehyde. I may effect the reduction of the carbon dioxid by treating it with a metallic hydrid such as palladium hydrid, though my invention is not restricted to the use of this substance, since any reagent that is capable of reducing carbon dioxid to formaldehyde may be employed. This partial reduction results in a gaseous mixture of carbon dioxid and formaldehyde and any suitable phenolic or cresylic substance is then treated with this mixture, either with or without the application of heat and pressure. The carbon dioxid acts as a condensing agent, and it is itself absorbed in the resulting resinous mass, so that my product contains little or no free condensing agent. This fact renders my resinous products greatly superior to the products that have been produced heretofore with the aid of alkaline or strongly acid condensing agents, the presence of which in the final products is often injurious to the materials with which such products come in contact.

In carrying out my process commercially, carbon dioxid may be obtained from flue gases, which are first washed to remove solid and tarry impurities and then passed into a vessel, containing a metallic hydrid, such as palladium hydrid, suspended in water. The metallic hydrid effects the reduction of the carbon dioxid to formaldehyde, and the supply of carbon dioxid should be so regulated that only a part of the carbon dioxid is so reduced during the passage of the gases through the treating vessel, whereby a mixture of carbon dioxid and formaldehyde is evolved, which is passed directly into a second vessel containing commercial phenol, cresol, or other suitable phenolic substance.

The end point of the reaction which takes place in the second treating vessel is indicated by a marked increase in the viscosity of the liquid. The period during which the reaction is continued is also determined by the character of the final product that is desired, since either fusible or infusible products may be produced by varying the length of the reaction period. The products become more and more infusible as the reaction continues. When a highly infusible product is desired, and a sample solidifies on heating, the supply of carbon dioxid and formaldehyde may be cut off. Further treatment with the gaseous mixture will, however, cause no damage to the product, but will only waste the gases. The condensing reaction may be hastened by heating the vessel in which the reaction takes place. No special degree of temperature is essential, however, unless a particularly rapid condensation is desired.

The subsequent treatment of the resulting resinous products forms no part of my present invention. It may be stated, however, that these products may be converted from their initial liquid form into a semi-solid and finally into a solid condition by simply permitting them to stand in contact with the air. Their solidification is accelerated by subjecting them to heat or pressure or both.

The initial stage of my process, in which carbon dioxid is treated with a metallic hydrid, results in the precipitation of the metal as oxid, and the hydrid may be readily regenerated by warming the metallic oxid in a current of hydrogen gas. Hydrogen gas may be easily and cheaply prepared by the well known process of passing steam over incandescent iron.

It will be observed that the repetition of my process requires the purchase of only a single starting material, namely, the phenolic substance, since a single supply of metallic hydrid may be used repeatedly, and since the flue gases, steam and iron fragments, which are the only other reagents employed, are easily obtainable in manufacturing establishments at little or no expense.

Many variations in the process which I have described may be devised by those skilled in the art without departing from the spirit and intent of my invention, which is to be limited, therefore, only by the scope of the appended claims.

I claim as my invention:

1. A process of preparing resinous products which comprises partially reducing carbon dioxid to formaldehyde and treating a phenolic substance with the partially reduced gas.

2. A process of preparing resinous products which comprises reacting upon carbon dioxid with a metallic hydrid until partial reduction of the carbon dioxid is effected and treating a phenolic substance with a product of such reaction.

3. A process of preparing resinous products which comprises partially reducing carbon dioxid with palladium hydrid and treating a phenolic substance with a product of such reaction.

4. A process of preparing resinous products which comprises partially reducing carbon dioxid with a metallic hydrid and treating a phenolic substance with the gaseous products of such reaction.

5. A process of preparing resinous products which comprises partly converting a substance that normally acts as a condensing agent into a substance that reacts with a phenolic substance to form condensation products, and treating a phenolic substance with the resulting mixture.

6. A process of preparing resinous products which comprises treating a phenolic substance with a condensing agent mixed with a reduction product of such condensing agent which reduction product is capable of reacting with the said phenolic substance to form a resinous condensation product.

In testimony whereof, I have hereunto subscribed my name this 2nd day of Feb., 1914.

JAMES P. A. McCOY.

Witnesses:
B. B. HINES,
M. C. MERZ.